(12) United States Patent
Teranishi et al.

(10) Patent No.: US 6,460,875 B1
(45) Date of Patent: Oct. 8, 2002

(54) INSTRUMENT PANEL FOR USE WITH AN AIR BAG

(75) Inventors: Sadao Teranishi; Takuya Kurimoto, both of Aichi (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/665,754

(22) Filed: Sep. 20, 2000

(51) Int. Cl.$^7$ .............................................. B60R 21/16
(52) U.S. Cl. .................... 280/728.3; 280/732
(58) Field of Search .................. 280/728.1, 728.3, 280/732

(56) References Cited

U.S. PATENT DOCUMENTS

| | | | | |
|---|---|---|---|---|
| 5,447,328 A | * | 9/1995 | Iannazzi et al. | 280/728.3 |
| 5,451,075 A | * | 9/1995 | Parker et al. | 280/728.3 |
| 5,466,000 A | * | 11/1995 | Leonard et al. | 280/732 |
| 5,533,749 A | * | 7/1996 | Leonard et al. | 280/732 |
| 6,152,480 A | * | 11/2000 | Iwanaga | 280/728.3 |

* cited by examiner

Primary Examiner—Eric Culbreth (74) Attorney, Agent, or Firm—Wood, Phillips, Katz, Clark & Mortimer (57) ABSTRACT

The combination of an air bag having an undeployed state and a deployed state, and an instrument panel. The instrument panel overlies the air bag with the air bag in the undeployed state. The instrument panel has a skin layer with oppositely facing front and rear surfaces, a foamed resin layer on the rear surface of the skin layer and having a thickness, a core layer having an opening bounded by an edge through which the air bag extends with the air bag in the deployed state, and a door at the opening. The door has a peripheral edge and is repositionable from a closed position into an open position as an incident of the air bag changing from the undeployed state into the deployed state. The skin layer has a break portion defined by a groove at which the skin layer ruptures as the air bag changes from the undeployed state into the deployed state. The groove has first and second spaced sides and a base between the first and second sides. The groove produces a localized reduction in the thickness of the foamed resin layer and has at least a portion that is spaced outwardly from the edge bounding the opening in the core layer. At least a portion of the peripheral edge of the door extends outwardly from the edge bounding the core layer opening toward the groove but not past the groove.

33 Claims, 5 Drawing Sheets

INSTRUMENT PANEL FOR USE WITH AN AIR BAG

BACKGROUND OF THE INVENTION

1. Field of the Invention

This invention relates to air bags and, more particularly, to an instrument panel to operatively overlie an air bag and through which the air bag can be extended as the air bag is changed by inflation thereof from an undeployed state into a deployed state.

2. Background Art

Figure 6:
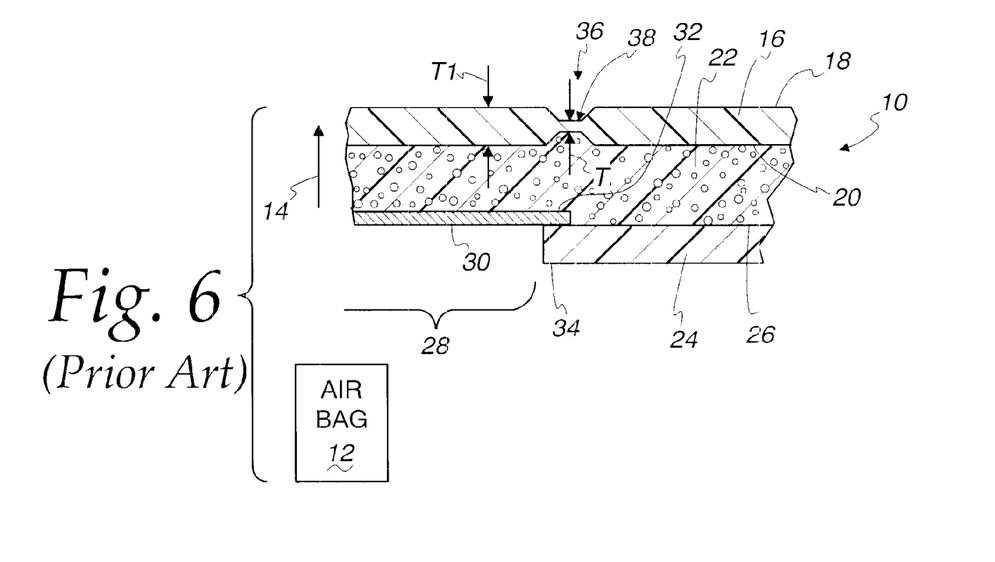
FIG. 6 is a fragmentary, cross-sectional view of a conventional instrument panel operatively overlying an air bag.

In FIG. 6, an instrument panel is shown at 10 to be operatively placed over an air bag 12. The instrument panel 10 is constructed so that the air bag 12, upon being deployed by inflation, can extend through the instrument panel 10 in a direction indicated by the arrow 14.

The instrument panel 10 consists of a skin layer 16 having an exposed front surface 18 and an oppositely facing rear surface 20. A foamed resin layer 22 is laminated to the rear surface 20 of the skin layer 16. A core layer 24 is adhered to the rear surface 26 of the foamed resin layer 22 and has an opening 28 formed therethrough. A door 30 is adhered to the rear surface 26 of the foamed resin layer 22 and has a joint portion 32 which abuts to a joint portion 34 on the core layer 24.

The skin layer 16 has a weakening break portion 36. The break portion 36 consists of a region 38 in the skin layer 16 having at thickness T that is less than the thickness T1 of the remainder of the skin layer 16. The skin layer 16 may be, for example, an olefinic thermoplastic elastomer (TPO). Deployment of the air bag 12, by inflation thereof, causes the door 30 to advance in the direction of the arrow 14 and to thereby rupture the foamed resin layer 22 and the skin layer 16 in the vicinity of the break portion 36.

With this construction, it is difficult to select the adhesive force between the skin layer 16 and the foamed resin layer 22 and the desired load on the skin layer 16 that produce elongation and breakage of the skin layer 16 to provide the desired operating characteristics for the instrument panel 10. Trial and error may thus be required to arrive at the desired operating characteristics.

Figure 7:
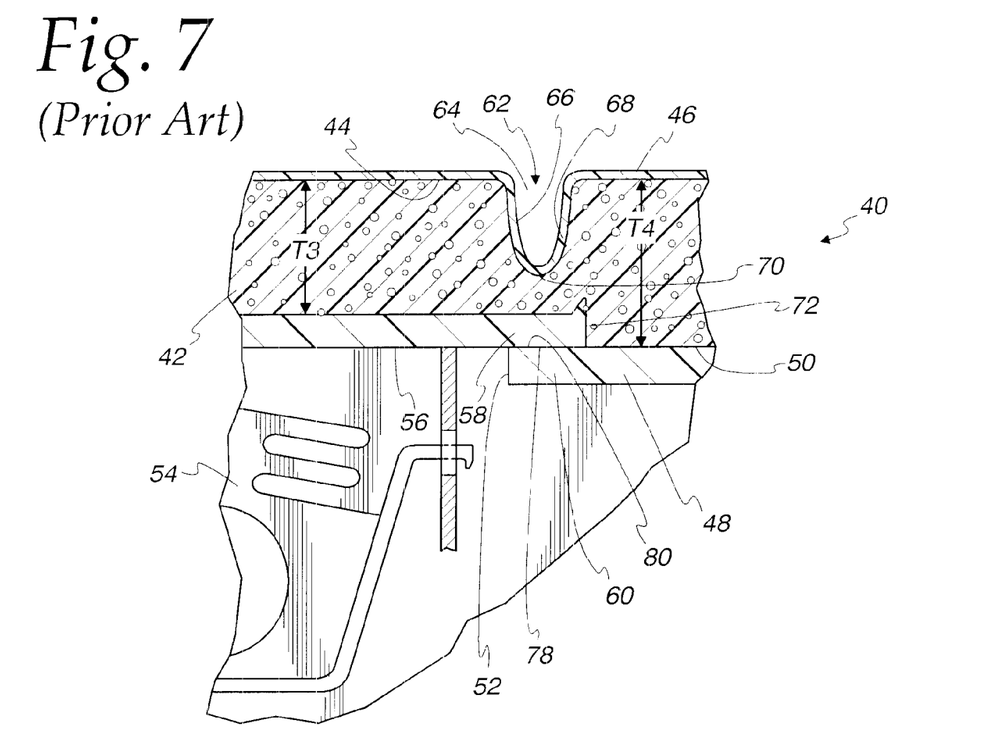
FIG. 7 is a fragmentary, cross-sectional view of another form of conventional instrument panel operatively overlying an air bag.
Figure 8:
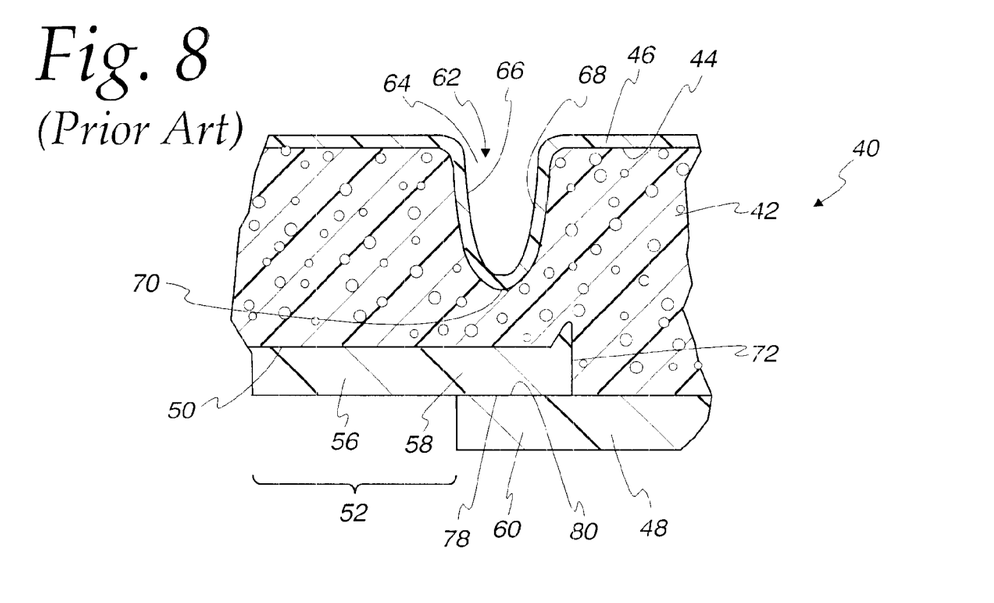
FIG. 8 is an enlarged, fragmentary, cross-sectional view of a break portion on the instrument panel in FIG. 7.
Figure 9:
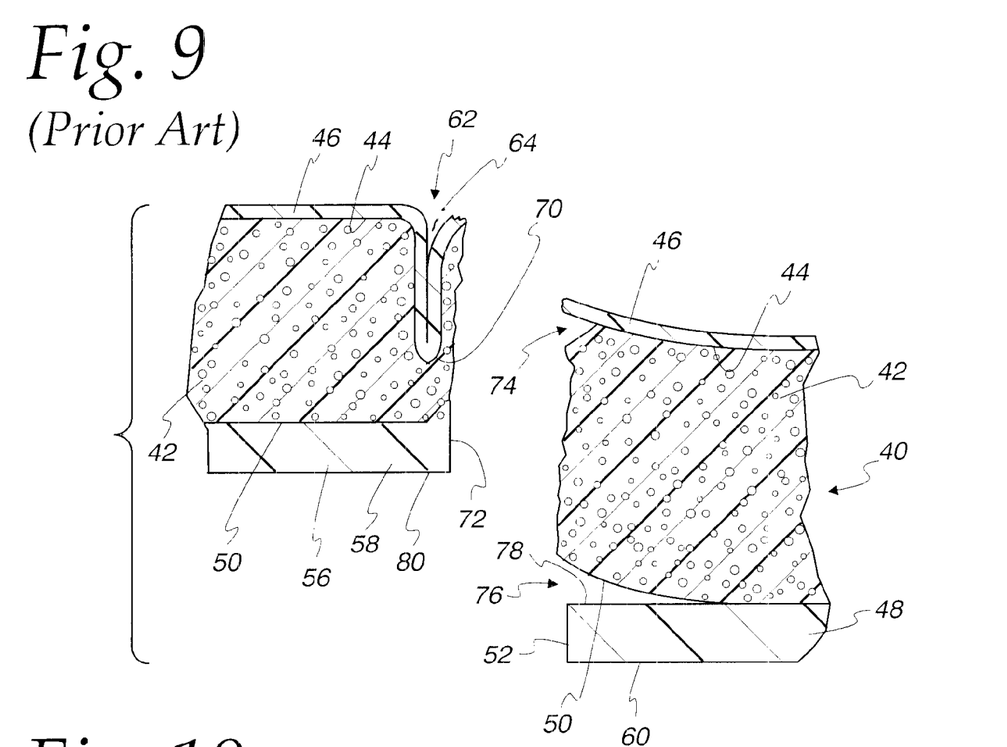
FIG. 9 is a view as in FIG. 8 with the air bag deployed and the instrument panel ruptured.

Another form of conventional instrument panel is shown at 40 in FIGS. 7–9. In the instrument panel 40, a foamed resin layer 42 is laminated to the rear surface 44 of a skin layer 46. A core layer 48 is laminated to the rear surface 50 of the foamed resin layer 42. The core layer 48 has an opening 52 therethrough to allow an air bag 54 to extend therethrough as the air bag 54 is changed from an undeployed state, as shown in FIG. 7, by deflation, to a deployed state. A door 56 laminated to the rear surface 50 of the foamed resin layer 42 covers the opening 52. The door 56 has a joint portion 58 which abuts a joint portion 60 on the core layer 48.

The instrument panel 40 has a break portion 62. The break portion 62 consists of a groove 64. The groove 64 has a U shape defined by spaced sides 66, 68 between which a base 70 is defined. The skin layer 46 may be made, for example, from an olefinic thermoplastic elastomer (TPO).

Upon deployment of the air bag 54, the pressure applied to the door 56 causes the foamed resin layer 42 and skin layer 46 to rupture adjacent to the break portion 62. In this construction, the door 56 spans the opening 52 slightly behind the base 70 and extends outwardly past the groove 64 so that a peripheral edge 72 resides slightly beyond the groove side 68. As a result, as shown in FIG. 9, fracture may occur not precisely at the break portion 62, but rather spaced to the side thereof at the location of the edge 72. As this occurs, the edge 72 of the door 56 raises the foamed resin layer 42 and skin layer 46 to cause delamination both in the region at 74 between the skin layer 46 and foamed resin layer 42 and in the region at 76 between the foamed resin layer 42 and the core layer 48.

Another problem with the instrument panel 40 in FIG. 7 is that passage of the resin layer, in its liquid state, between the joint portions 58, 60 is prevented only by facing and abutting surfaces 78, 80 thereon. As a result, leakage of the foamed resin liquid may occur as the foamed resin liquid is cast during formation of the instrument panel 40.

To address this resin leakage problem, various solutions have been proposed, for example, in Japanese Patent Laid-Open No. 52826/1998, Japanese Patent Laid-Open No. 211625/1998, Japanese Patent Laid-Open No. 235661/1998, and Japanese Patent Laid-Open No. 188747/1999. In each of these disclosures, the problem of resin leakage between the core material and the skin is addressed. None of the above disclosures discloses a solution for preventing leakage of resin between abutting materials which are relatively hard.

Figure 10:
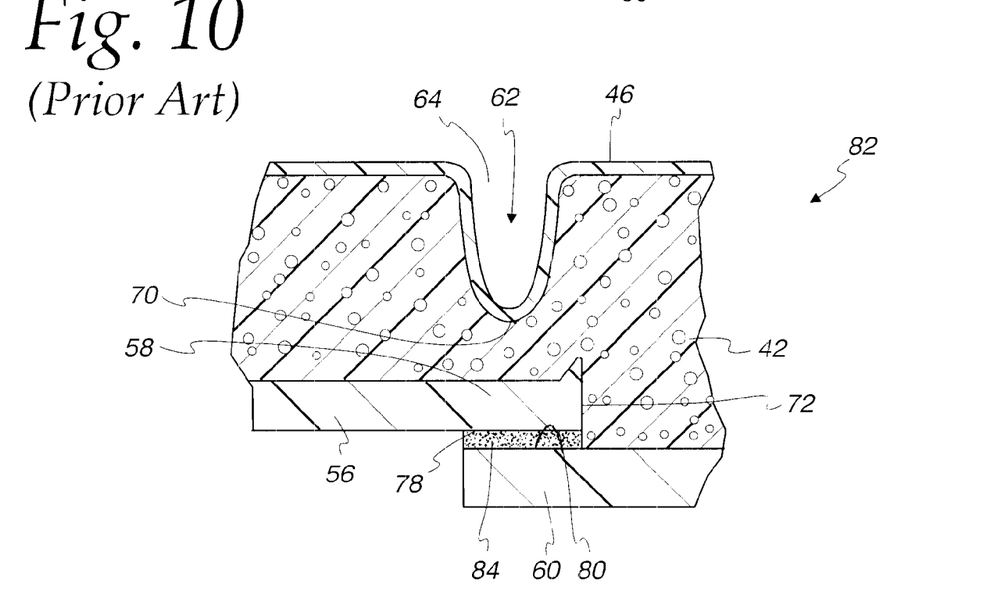
FIG. 10 is an enlarged, fragmentary, cross-sectional view of a further form of a conventional instrument panel with a sealing tape interposed between a door and a core layer.

One proposed solution to the leakage problem is shown in FIG. 10 on an instrument panel 82, which has the same construction as the instrument panel 40 with the exception of one addition. In the instrument panel 82, a sealing tape 84 is interposed between the surfaces 78, 80 on the joint portions 58, 60. The sealing tape 84 may not effectively solve the leakage problem in the event that there is poor dimensional accuracy of the surfaces 78, 80 on the joint portions 58, 60. Further, if the sealing tape 84 does not effectively bond, leakage may occur whereupon burrs of solidified foamed resin may be formed. These burrs may be undesirable for cosmetic reasons, which may necessitate removal thereof.

Another problem with the instrument panel 40 in FIG. 7 is that by reason of the over/underlying relationship of the core layer 48 and door 56, the foamed resin layer 42 has a thickness T3 between the skin layer 46 and the door 56 that is less than the thickness T4 between the skin layer 46 and the core layer 48. As a result, there may be residual strain in the foamed resin layer 42, resulting in the appearance of a step in the vicinity of the edge 72 which is visible to the naked eye at the front of the instrument panel 40.

SUMMARY OF THE INVENTION

In one form, the invention is directed to the combination of an air bag having an undeployed state and a deployed state, and an instrument panel. The instrument panel overlies the air bag with the air bag in the undeployed state. The instrument panel has a skin layer with oppositely facing front and rear surfaces, a foamed resin layer on the rear surface of the skin layer and having a thickness, a core layer having an opening bounded by an edge through which the air bag extends with the air bag in the deployed state, and a door at the opening. The door has a peripheral edge and is repositionable from a closed position into an open position as an incident of the air bag changing from the undeployed state into the deployed state. The skin layer has a break portion defined by a groove at which the skin layer ruptures as the air bag changes from the undeployed state into the deployed state. The groove has first and second spaced sides and a base between the first and second sides. The groove produces a localized reduction in the thickness of the foamed resin layer and has at least a portion that is spaced outwardly from the edge bounding the opening in the core layer. At least a portion of the peripheral edge of the door extends outwardly from the edge bounding the core layer opening toward the groove but not past the groove.

In one form, the door has a generally flat first surface and an offset surface portion adjacent to the peripheral edge of the door that makes an angle with the first flat surface.

In one form, the door has a generally flat front surface and a corner at the juncture of the front of the door and the peripheral edge. An angle defined between a line extending from the corner to the groove base and the flat front surface of the door is in the range of 30° to 90°.

In one form, an extension of the offset surface portion intersects the groove.

In one form, the core layer has a joint portion and the door has a joint portion and the joint portions are in abutting relationship.

One of the joint portions may have a projection, with the other joint portion having a receptacle for the projection.

The projection may have a convex surface, with the receptacle having a shape that is complementary to the convex surface.

In one form, the other of the joint portions has oppositely facing surfaces, the receptacle is on one of the oppositely facing surfaces on the other joint portion, and there is a second projection on the other of the oppositely facing surfaces on the other joint portion.

In one form, the other of the oppositely facing surfaces on the other joint portion is on the core layer and faces rearwardly away from the foamed resin layer.

In one form, one of the joint portions has an offset end defining a step within which the other of the joint portions resides.

The joint portions may overlap in a direction transverse to a fore and aft line. Each of the joint portions has a front surface and a rear surface. In one form, the front surfaces of the joint portions are substantially flush with each other in a fore and aft direction.

In one form, the core layer consists of at least one of a) polypropylene, b) ABS resin, c) acrylonitrile-styrene copolymer, d) modified polyphenylene oxide, e) styrene-maleic anhydride copolymer, f) polypropylene resin, g) a thermoplastic material, and h) thermoplastic olefin (TPO).

In one form, the skin layer consists of at least one of a) a thermoplastic material, b) polyvinyl chloride resin (PVC), c) a compound resin of PVC and acrylonitrile-butadiene-styrene copolymer (ABS), and d) thermoplastic olefin (TPO).

In one form, the foamed resin layer consists of at least one of a) PVC, b) olefinic thermoplastic elastomer (TPO), c) styrenic thermoplastic elastomer (TPC), d) urethanic thermoplastic elastomer (TPU), e) polyester-type thermoplastic elastomer, and f) a blowing agent.

The invention is also directed an instrument panel for placement operatively over an air bag which is changeable from an undeployed state into a deployed state. The instrument panel has a skin layer having oppositely facing front and rear surfaces, a cushioning layer on the rear surface of the skin layer, a core layer having an opening through which an air bag can be extended as an air bag over which the instrument panel is operatively placed changes from the undeployed state into the deployed state, and a door at the opening. The door has a peripheral edge and is repositionable from a closed position into an open position as an incident of an air bag over which the instrument panel is operatively placed being changed from the undeployed state into the deployed state. The skin layer has a break portion defined by a groove at which the skin layer ruptures as an air bag over which the instrument panel is operatively placed is changed from the undeployed state into the deployed state. The groove has first and second spaced sides and a base between the first and second sides, produces a localized reduction in the thickness of the cushioning layer, and has at least a portion that is spaced outwardly from the edge bounding the opening in the core layer. At least a portion of the peripheral edge of the door extends outwardly from the edge bounding the core layer opening toward the groove but not past the groove.

The invention is also directed to an instrument panel for placement operatively over an air bag which is changeable from an undeployed state into a deployed state. The instrument panel has a skin layer having oppositely facing front and rear surfaces, at least one layer applied to the rear surface of the skin layer and including a core layer having an opening through which an air bag can be extended as an air bag over which the instrument panel is operatively placed changes from the undeployed state into the deployed state, and a door at the opening. The door has a peripheral edge and is repositionable from a closed position into an open position as an incident of the air bag over which the instrument panel is operatively placed being changed from the undeployed state into the deployed state. The groove produces a weakening in the instrument panel in a region at which rupture of the at least one layer occurs as an incident of an air bag over which the instrument panel is operatively placed being changed from the undeployed state into the deployed state. At least a portion of the peripheral edge of the door extends outwardly from the edge bounding the core layer opening toward the groove but not past the groove.

The invention is also directed to an instrument panel for placement operatively over an air bag which is changeable from an undeployed state into a deployed state. The instrument panel includes a skin layer having oppositely facing front and rear surfaces and at least one layer applied to the rear surface of the skin layer and including a core layer having an opening through which an air bag can be extended as an air bag over which the instrument panel is operatively placed changes from the undeployed state into the deployed state. The core layer and door each have a joint portion, with the joint portions being in abutting relationship. One of the joint portions has a projection and the other of the joint portions has a receptacle for receiving the projection.

The invention is also directed to an instrument panel for placement operatively over an air bag which is changeable from an undeployed state into a deployed state. The instrument panel has a skin layer having oppositely facing front and rear surfaces and at least one layer applied to the rear surface of the skin layer. The at least one layer includes a core layer having an opening through which an air bag can be extended as an air bag over which the instrument panel is operatively placed changes from the undeployed state into the deployed state. The core layer and door each have a joint portion, with the joint portions being in abutting relationship. One of the joint portions has an offset end defining a step within which the other of the joint portions resides.

DETAILED DESCRIPTION OF THE DRAWINGS

Figure 1:
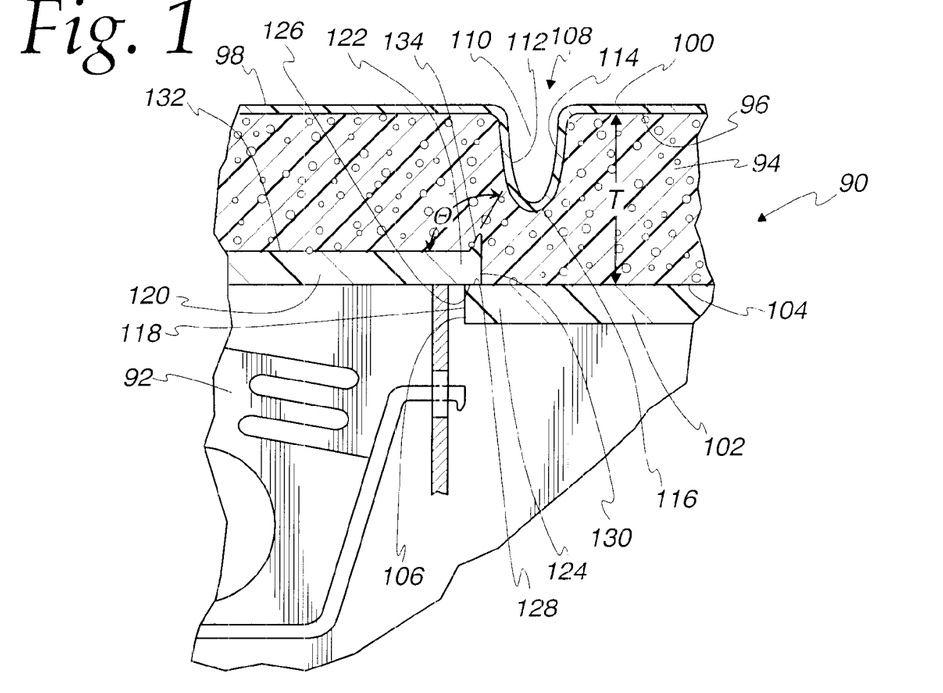
FIG. 1 is a fragmentary, cross-sectional view of an instrument panel, made according to the present invention, and operatively overlying an air bag.

Referring initially to FIG. 1, an instrument panel, according to the present invention, is shown at 90 operatively overlying an air bag 92 which is shown in an undeployed state and which is inflatable to a deployed state. The instrument panel 90 consists of a cushioning layer, which is preferably a foamed resin layer 94 that is laminated to a rear surface 96 of a skin layer 98. A forward surface 100 of the skin layer 98, facing oppositely to the surface 96, is exposed, as to a compartment in a vehicle within which a passenger resides. A core layer 102 is laminated to a rear surface 104 of the foamed resin layer 94. The core layer 102 has an opening 106 therethrough through which the air bag 92 extends upon inflation thereof whereupon the air bag 92 changes from the undeployed state into the deployed state.

The skin layer 98 has a break portion 108 defined by a groove 110. The groove 110 is defined by first and second spaced sides 112, 114 and a base 116 between the first and second sides 112, 114. The groove provides a localized reduction in the thickness T of the foamed resin layer 94. The groove 110 is spaced at least partially, and preferably fully, outside of an edge 118 bounding the opening 106.

The instrument panel 90 further includes a door 120 which is laminated to the rear surface 104 of the foamed resin layer 94. The door 120 has a joint portion 122 which abuts to a joint portion 124 on the core layer 102. More specifically, the joint part 122 has a surface 126 that facially abuts a surface 128 on the core layer 102 with the door 120 in the closed position of FIG. 1.

The door 120 in this embodiment spans the opening 106 and projects outwardly to a point that a peripheral edge 130 on the door 120 does not extend fully to the location of the groove 110. The edge 130 may extend to a point of vertical coincidence with the groove 110 in FIG. 1, but preferably does not extend in FIG. 1 to beyond the location of the groove 110.

The door 120 has a generally flat front surface 132 with a portion residing in a plane that is generally parallel to the plane of a forwardly facing flat surface portion on the skin layer 98 and an offset surface portion 134 adjacent to the peripheral edge 130. Preferably the groove 110 is spaced along the plane outwardly from at least a portion of the peripheral edge 130. The offset surface portion 134 is substantially flat and extends along a line that makes an obtuse angle θ with the front surface 132.

Figure 2:
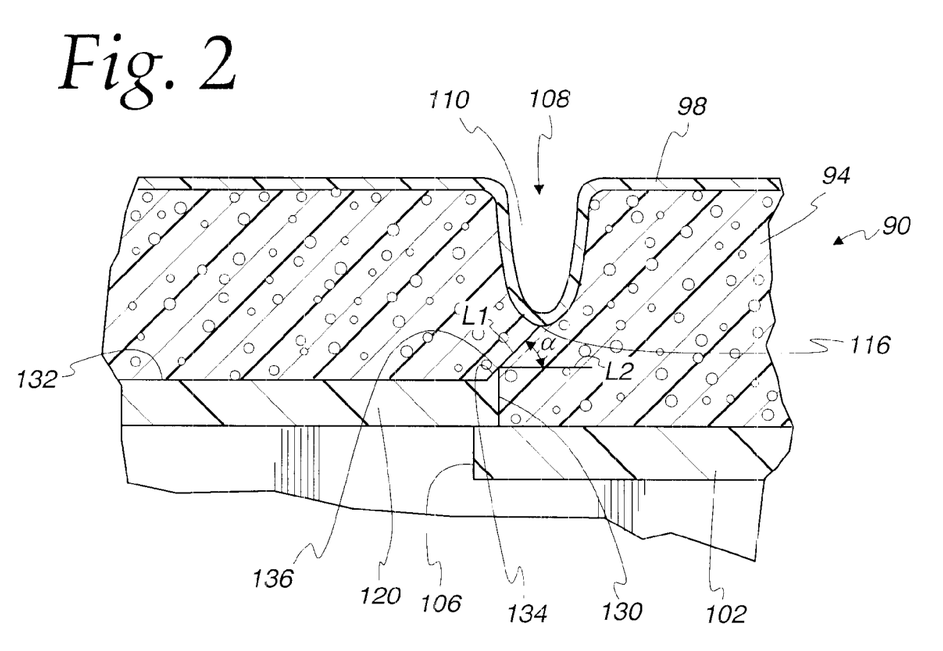
FIG. 2 is an enlarged, fragmentary, cross-sectional view of a break portion on the instrument panel in FIG. 1 in the vicinity of which the instrument panel to ruptures upon deployment of the air bag.

As shown in FIG. 2, the door 120 has a corner 136 at the juncture of the front of the door 120 and the edge 130. A line L1 extending from the corner 136 to the base 116 makes an angle a with a line L2 parallel to the door surface 132. The angle a is preferably between 30° to 90°. In this case, the line L1 is substantially parallel to the surface portion 134.

The break portion 108 is situated to provide a weakening in the vicinity of which the foamed resin layer 94 ruptures. If the angle is less than 30°, the foamed resin layer 94 may break at a location spaced from the groove 110 closer to the opening 106. As a result, delamination may occur between the skin layer 98 and the foamed resin layer 94. On the other hand, if the angle a exceeds 90°, delamination may occur between the skin layer 98 and the foamed resin layer 94 as well as between the foamed resin layer 94 and the core layer 102.

Figure 3:
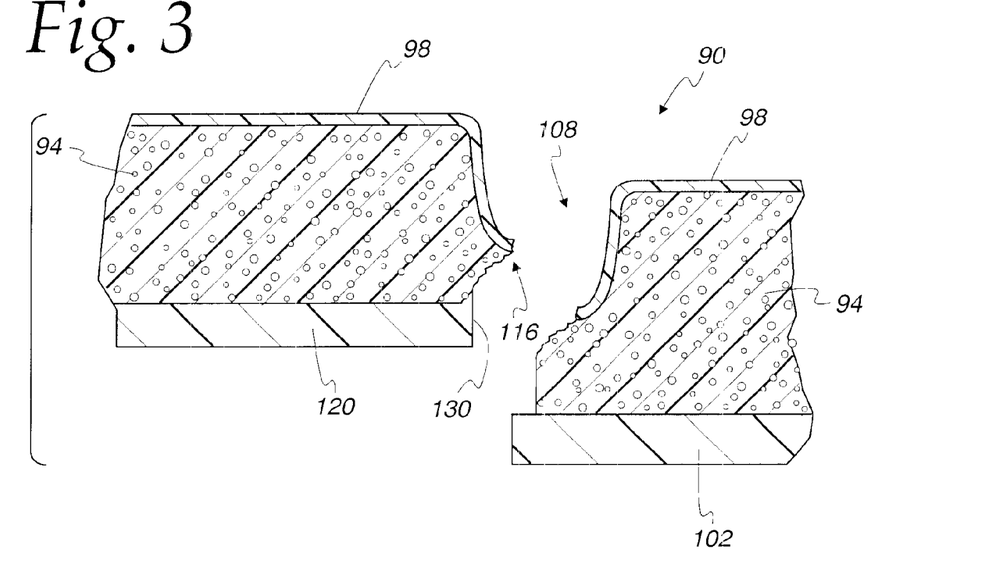
FIG. 3 is a view as in FIG. 2 with the air bag deployed and the instrument panel ruptured.

In FIG. 3, the instrument panel 90 is shown with the door 120 in an open state as an incident of the air bag 92 being deployed, whereupon the foamed resin layer 94 and the skin layer 98 are ruptured at the break portion 108. As illustrated, with the foamed resin layer 94 ruptured at the break portion 108, whereat the foamed resin layer 94 has a reduced thickness, no excessive force is produced on the skin layer 98. As a result, there is a reduced tendency of delamination to take place between the foamed resin layer 94 and skin layer 98 and foamed resin layer 94 and core layer 102.

Figure 4:
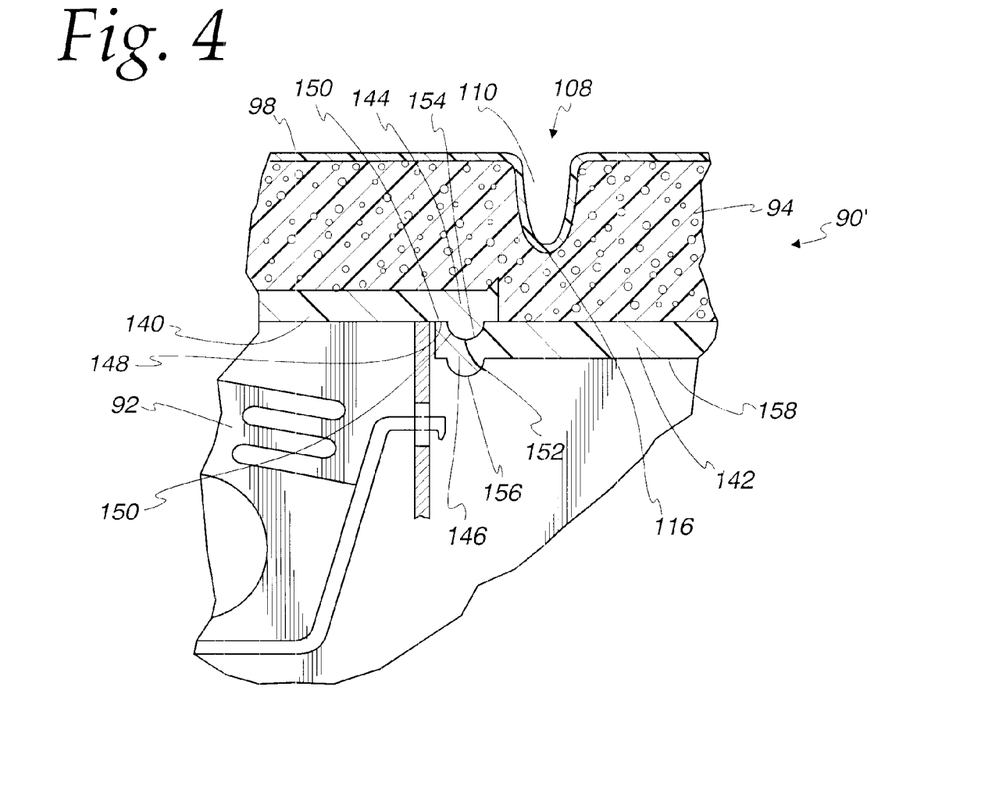
FIG. 4 is a view as in FIG. 1 of a modified form of instrument panel, according to the present invention, which has a modified form of connection between a core layer defining an opening for the air bag to deploy and a door over the opening.

In FIG. 4, an instrument panel is shown at 90', according to the present invention, that is similar in construction to the instrument panel 90 with the exception of the configuration of, and cooperation between, a door 140 and core layer 142, corresponding to the door 120 and core layer 102 on the instrument panel 90'. The door 140 has a joint portion 144 which abuts to a joint portion 146 on the core layer 142. The joint portion 144 has a rearwardly facing surface 148 which abuts to a forwardly facing surface 150 on the joint portion 146. The joint portion 144 has a projection 150 extending in a rearward direction. The projection 150 has a convex surface 152. The joint portion 146 has a cup-shaped receptacle 154 that is complementary to the projection surface 152 to closely receive the same and opening in a direction along a line extending in a fore-and-aft direction that is generally orthogonal to the plane of the door surface 132. Cooperation between the projection 150 and receptacle 154 develops a seal between the door 140 and core layer 142 to prevent leakage of the foamed resin liquid therebetween. While the projection surface 152 and receptacle 154 are shown to be curved, the complementary shapes could be rectangular or virtually any other cooperating shape. The curved construction is preferred in that a seal can be established even though there may be a slight misalignment between the projection 150 and receptacle 154 resulting from a slight misalignment of the door 140 and core layer 142.

To avoid weakening of the core layer 142 at the receptacle 154, a projection 156 is provided on the rear surface 158 of the core layer 142 to increase the thickness thereat. The projection 156 may have a shape complementary to the receptacle 154 so that the thickness of the core layer 142 is substantially uniform over its entire extent.

Figure 5:
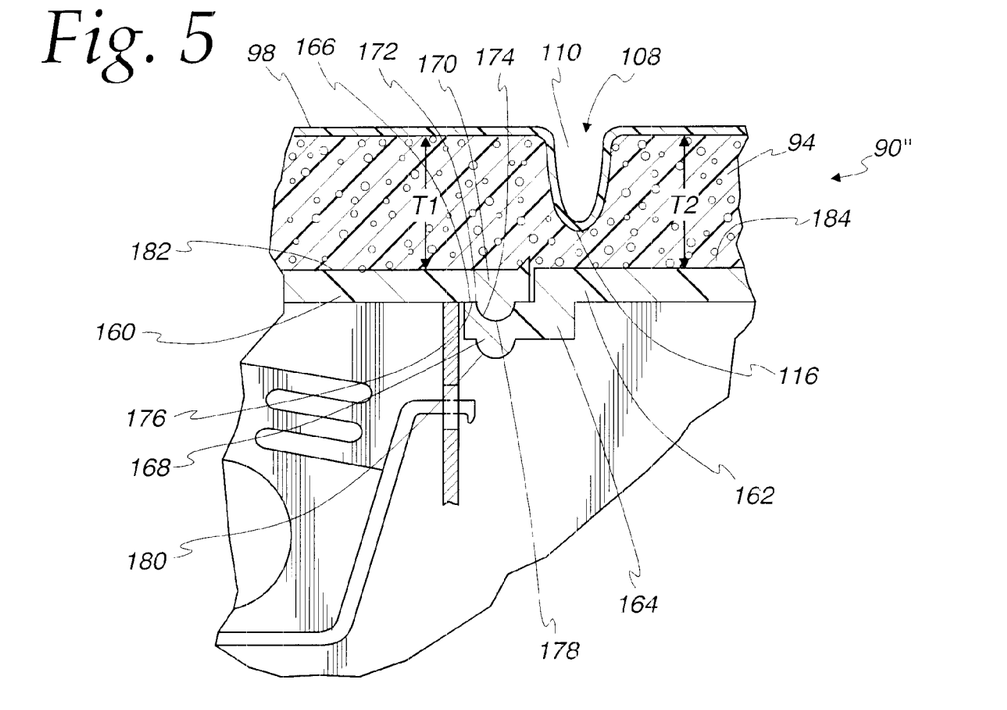
FIG. 5 is a view as in FIG. 4 showing a further modified form of door and core layer made according to the present invention.

In FIG. 5, another form of instrument panel is shown at 90" according to the present invention. The instrument panel 90" is similar to the instrument panel 90' with the exception of the configuration and cooperation between a door 160 and core layer 162 corresponding to the door 140 and core layer 142 on the instrument panel 90'. The door 160 actually has the same configuration as the door 140. The core layer 162 has an offset end 164 which defines a step 166. The offset end 164 defines a joint portion 168 on the core layer 162 which cooperates with a joint portion 170 on the door 160 by abutment therewith. The joint portion 168 has a surface 172 defining a receptacle 174 which abuts to a surface 176 and a projection 178 which is convex and complementary to the receptacle 174. A projection 180, corresponding to the projection 156, maintains the thickness of the offset end 164 of the core layer 162 substantially uniform in the region of the receptacle 174.

With this configuration, in spite of the over/undedying relationship of the joint portions 168, 170, the front surfaces 182, 184 of the door 160 and core layer 162, respectively, are substantially flush with each other in a fore and aft direction. Consequently, the thicknesses of the foamed resin layer T1, T2 at the door 160 and core layer 162 are substantially the same. As a result, there is no strain produced on the foamed resin layer 94 attributable to a difference in thickness that might manifest itself as a step that is visible from the front of the instrument panel 90".

The material of the core layer 102 is preferably at least one of polypropylene, ABS resin, acrylonitrile-styrene copolymer, modified polyphenylene oxide and styrene-maleic anhydride copolymer, a polypropylene resin, and a thermoplastic material such as thermoplastic olefin (TPO). The core material and air bag may be made using a molding process, such as injection molding. The compositions are preferred for cost and recycling purposes.

The skin layer 98 may be formed into a sheet by vacuum forming or slush casting of a thermoplastic material such as vinyl chloride resin (PVC), compound resin of PVC and acrylonitrile-butadiene-styrene copolymer (ABS), and thermoplastic olefin material (TPO). Use of TPO is preferred in view of its recycling characteristics.

The foam/foamed resin layer 94 is preferably formed by blowing at least one of PVC, olefinic thermoplastic elastomer (TPO), styrenic thermoplastic elastomer (TPC), urethanic thermoplastic elastomer (TPU) or polyester-type thermoplastic elastomer with the addition of a blowing agent.

The foregoing disclosure of specific embodiments is intended to be illustrative of the broad concepts comprehended by the invention.

We claim:

1. In combination:
   a) an air bag having an undeployed state and a deployed state; and
   b) an instrument panel which overlies the air bag with the air bag in the undeployed state, the instrument panel comprising:
      i) a skin layer having oppositely facing front and rear surfaces;
      ii) a foamed resin layer on the rear surface of the skin layer, the foamed resin layer having a thickness;
      iii) a core layer having an opening through which the air bag extends with the air bag in the deployed state, the opening bounded by an edge; and
      iv) a door at the opening, the door having a substantially flat surface portion residing in a plane and a peripheral edge and being repositionable from a closed position into an open position as an incident of the air bag changing from the undeployed state into the deployed state,
   the skin layer having a break portion defined by a groove at which the skin layer ruptures as the air bag changes from the undeployed state into the deployed state,
   the groove having first and second spaced sides and a base between the first and second sides and producing a localized reduction in the thickness of the foamed resin layer and having at least a portion that is spaced outwardly from the edge bounding the opening in the core layer,
   at least a portion of the peripheral edge of the door extending along the plane outwardly from the edge bounding the core layer opening toward the groove but not up to the groove so that the groove is spaced along the plane outwardly from at least a portion of the peripheral edge.

2. The combination according to claim 1 wherein the door has a generally flat first surface and an offset surface portion adjacent to the peripheral edge of the door that makes an angle with the first flat surface.

3. The combination according to claim 2 wherein an extension of the offset surface portion intersects the groove.

4. The combination according to claim 1 wherein the door has a generally flat front surface and a corner at the juncture of the front of the door and the peripheral edge and an angle defined between a line extending from the corner to the groove base and the flat front surface of the door is in the range of 30° to 90°.

5. The combination according to claim 1 wherein the core layer has a joint portion and the door has a joint portion, and the joint portions are in abutting relationship.

6. The combination according to claim 5 wherein one of the joint portions has a projection and the other of the joint portions has a receptacle for the projection.

7. The combination according to claim 6 wherein the projection has a convex surface and the receptacle has a shape that is complementary to the convex surface.

8. The combination according to claim 6 wherein the other of the joint portions has oppositely facing surfaces, the receptacle is on one of the oppositely facing surfaces on the other joint portion and there is a second projection on the other of the oppositely facing surfaces on the other joint portion.

9. The combination according to claim 8 wherein the other of the oppositely facing surfaces on the other joint portion is on the core layer and faces rearwardly away from the foamed resin layer.

10. The combination according to claim 5 wherein one of the joint portions has an offset end defining a step within which the other of the joint portions resides.

11. The combination according to claim 5 wherein the joint portions overlap in a direction transverse to a fore and aft line, each of the joint portions has a front surface and a rear surface, and the front surfaces of the joint portions are substantially flush with each other in a fore and aft direction.

12. The combination according to claim 1 wherein the core layer comprises at least one of a) polypropylene, b) ABS resin, c) acrylonitrile-styrene copolymer, d) modified polyphenylene oxide, e) styrene-maleic anhydride copolymer, f) polypropylene resin, g) a thermoplastic material, and h) thermoplastic olefin (TPO).

13. The combination according to claim 1 wherein the skin layer comprises at least one of a) a thermoplastic material, b) polyvinyl chloride resin (PVC), c) a compound resin of PVC and acrylonitrile-butadiene-styrene copolymer (ABS), and d) thermoplastic olefin (TPO).

14. The combination according to claim 1 wherein the foamed resin layer comprises at least one of a) PVC, b)

olefinic thermoplastic elastomer (TPO), c) styrenic thermoplastic elastomer (TPC), d) urethanic thermoplastic elastomer (TPU), e) thermoplastic elastomer comprising polyester, and f) a blowing agent.

15. An instrument panel for placement operatively over an air bag which is changeable from an undeployed state into a deployed state, the instrument panel comprising:

a skin layer having oppositely facing front and rear surfaces;

a cushioning layer on the rear surface of the skin layer, the cushioning layer having a thickness;

a core layer having an opening through which an air bag can be extended as an air bag over which the instrument panel is operatively placed changes from the undeployed state into the deployed state, the opening bounded by an edge; and a door at the opening, the door having a substantially flat surface portion residing in a plane and a peripheral edge and being repositionable from a closed position into an open position as an incident of an air bag over which the instrument panel is operatively placed being changed from the undeployed state into the deployed state, the skin layer having a break portion defined by a groove at which the skin layer ruptures as an air bag over which the instrument panel is operatively placed changes from the undeployed state into the deployed state, the groove having first and second spaced sides and a base between the first and second sides and producing a localized reduction in the thickness of the cushioning layer and having at least a portion that is spaced outwardly from the edge bounding the opening in the core layer, at least a portion of the peripheral edge of the door extending along the plane outwardly from the edge bounding the core layer opening toward the groove but not up to the groove so that the groove is spaced along the plane outwardly from at least a portion of the peripheral edge.

16. The instrument panel according to claim 15 wherein the door has a generally flat first surface and an offset surface portion adjacent to the peripheral edge of the door that makes an angle with the first flat surface.

17. The instrument panel according to claim 16 wherein an extension of the offset surface portion intersects the groove.

18. The instrument panel according to claim 15 wherein the door has a generally flat front surface and a corner at the juncture of the front of the door and the peripheral edge and an angle defined between a line extending from the corner to the groove base and the flat front surface of the door is in the range of 30° to 90°.

19. The instrument panel according to claim 15 wherein the core layer has a joint portion and the door has a joint portion, and the joint portions are in abutting relationship.

20. The instrument panel according to claim 19 wherein one of the joint portions has a projection and the other of the joint portions has a receptacle for the projection.

21. The instrument panel according to claim 20 wherein the projection has a convex surface and the receptacle has a shape that is complementary to the convex surface.

22. The instrument panel according to claim 20 wherein the other of the joint portions has oppositely facing surfaces, the receptacle is on one of the oppositely facing surfaces on the other joint portion and there is a second projection on the other of the oppositely facing surfaces on the other joint portion.

23. The instrument panel according to claim 22 wherein the other of the oppositely facing surfaces on the other joint portion is on the core layer and faces rearwardly away from the cushioning layer.

24. The instrument panel according to claim 19 wherein one of the joint portions has an offset end defining a step within which the other of the joint portions resides.

25. The instrument panel according to claim 19 wherein the joint portions overlap in a direction transverse to a fore and aft line, each of the joint positions has a front surface and a rear surface, and the front surfaces of the joint portions are substantially flush with each other in a fore and aft direction.

26. An instrument panel for placement operatively over an air bag which is changeable from an undeployed state into a deployed state, the instrument panel comprising:

a skin layer having oppositely facing front and rear surfaces;

at least one layer applied to the rear surface of the skin layer, said at least one layer comprising a core layer having an opening through which an air bag can be extended as an air bag over which the instrument panel is operatively placed changes from the undeployed state into the deployed state, the opening bounded by an edge; and a door at the opening, the door having a substantially flat surface portion residing in a plane and a peripheral edge and being repositionable from a closed position into an open position as an incident of an air bag over which the instrument panel is operatively placed being changed from the undeployed state into the deployed state, the skin layer comprising a groove producing a weakening in the instrument panel in a region at which rupture of the at least one layer occurs as an incident of an air bag on which the instrument panel is operatively placed being changed from the undeployed state into the deployed state, at least a portion of the peripheral edge of the door extending along the plane outwardly from the edge bounding the core layer opening toward the groove but not up to the groove so that the groove is spaced along the plane outwardly from at least a portion of the peripheral edge.

27. An instrument panel for placement operatively over an air bag which is changeable from an undeployed state into a deployed state, the instrument panel comprising:

a skin layer having oppositely facing front and rear surfaces, the front surface having a generally flat surface portion residing in a plane; and at least one layer applied to the rear surface of the skin layer, said at least one layer comprising a core layer having an opening through which an air bag can be extended as an air bag over which the instrument panel is operatively placed changes from the undeployed state into the deployed state, the opening bounded by an edge; and a door at the opening, wherein the core layer has a joint portion and the door has a joint portion with the joint portions being in abutting relationship, wherein one of the joint portions has a projection and the other of the joint portions has a cup-shaped receptacle that opens in a direction along a line extending in a fore-and-aft direction through the front and rear surfaces of the skin layer and generally parallel to a line orthogonal to the plane and is complementary to the shape of the projection for receiving the projection.

28. The instrument panel according to claim 27 wherein the projection has a convex surface and the receptacle has a concave shape that is complementary to the convex surface.

29. An instrument panel for placement operatively over an air bag which is changeable from an undeployed state into a deployed state, the instrument panel comprising:
   a skin layer having oppositely facing front and rear surfaces, the front surface having a generally flat surface portion residing in a plane;
   at least one layer applied to the rear surface of the skin layer,
   said at least one layer comprising a core layer having an opening through which an air bag can be extended as an air bag over which the instrument panel is operatively placed changes from the undeployed state into the deployed state, the opening bounded by an edge; and
   a door at the opening,
   wherein the core layer has a joint portion and the door has a joint portion with the joint portions being in abutting relationship,
   wherein one of the joint portions has an offset end defining a step within which the other of the joint portions resides,
   wherein a first of the joint portions has a projection that is received in a receptacle on the joint portion which abuts to the first joint portion,
   wherein the receptacle opens in a direction along a line extending in a fore-and-aft direction through the front and rear surfaces of the skin layer and generally parallel to a line orthogonal to the plane.

30. In combination;
   a) an air bag having an undeployed state and a deployed state; and
   b) an instrument panel which overlies the air bag with the air bag in the undeployed state, the instrument panel comprising:
      i) a skin layer having oppositely facing front and rear surfaces;
      ii) a foamed resin layer on the rear surface of the skin layer, the foamed resin layer having a thickness;
      iii) a core layer having an opening through which the air bag extends with the air bag in the deployed state, the opening bounded by an edge; and
      iv) a door at the opening, the door having a substantially flat surface portion residing in a plane and a peripheral edge and being repositionable from a closed position into an open position as an incident of the air bag changing from the undeployed state into the deployed state,
   the skin layer having a break portion defined by a groove at which the skin layer ruptures as the air bag changes from the undeployed state into the deployed state,
   the groove having first and second spaced sides and a base between the first and second sides and producing a localized reduction in the thickness of the foamed resin layer and having at least a portion that is spaced outwardly from the edge bounding the opening in the core layer,
   at least a portion of the peripheral edge of the door extending along the plane outwardly from the edge bounding the core layer opening toward the groove but not up to the groove so that the groove is spaced along the plane outwardly from at least a portion of the peripheral edge,
   wherein the door has a generally flat front surface and a corner where two substantially flat surfaces meet at the juncture of the front of the door and the peripheral edge and an angle defined between a line extending from the corner to the groove base and the flat front surface of the door is in the range of 30° to 90°.

31. In combination:
   a) an air bag having an undeployed state and a deployed state; and
   b) an instrument panel which overlies the air bag with the air bag in the undeployed state, the instrument panel comprising:
      i) a skin layer having oppositely facing front and rear surfaces;
      ii) a foamed resin layer on the rear surface of the skin layer, the foamed resin layer having a thickness;
      iii) a core layer having an opening through which the air bag extends with the air bag in the deployed state, the opening bounded by an edge; and
      iv) a door at the opening, the door having a substantially flat surface portion residing in a plane and a peripheral edge and being repositionable from a closed position into an open position as an incident of the air bag changing from the undeployed state into the deployed state,
   the skin layer having a break portion defined by a groove at which the skin layer ruptures as the air bag changes from the undeployed state into the deployed state,
   the groove having first and second spaced sides and a base between the first and second sides and producing a localized reduction in the thickness of the foamed resin layer and having at least a portion that is spaced outwardly from the edge bounding the opening in the core layer,
   at least a portion of the peripheral edge of the door extending along the plane outwardly from the edge bounding the core layer opening toward the groove but not up to the groove so that the groove is spaced along the plane outwardly from at least a portion of the peripheral edge,
   wherein the door has a generally flat first surface and a substantially flat offset surface portion adjacent to the peripheral edge of the door that extends along a line that makes an obtuse angle with the first flat surface,
   wherein an extension of the line of the offset surface portion intersects the groove.

32. In combination:
   a) an air bag having an undeployed state and a deployed state; and
   b) an instrument panel which overlies the air bag with the air bag in the undeployed state, the instrument panel comprising:
      i) a skin layer having oppositely facing front and rear surfaces;
      ii) a foamed resin layer on the rear surface of the skin layer, the foamed resin layer having a thickness;
      iii) a core layer having an opening through which the air bag extends with the air bag in the deployed state, the opening bounded by an edge; and
      iv) a door at the opening, the door having a peripheral edge and being repositionable from a closed position into an open position as an incident of the air bag changing from the undeployed state into the deployed state, the skin layer having a break portion defined by a groove at which the skin layer ruptures as the air bag changes from the undeployed state into the deployed state, the groove having first and second spaced sides and a base between the first and second sides and producing a localized reduction in the thickness of the foamed resin layer and having at least a portion that is spaced outwardly from the edge bounding the opening in the core layer, at least a portion of the peripheral edge of the door extending outwardly from the edge bounding the core layer opening toward the groove but not past the groove, wherein the core layer has a joint portion and the door has a joint portion, and the joint portions are in abutting relationship, wherein one of the joint portions has a projection and the other of the joint portions has a cup-shaped receptacle for the projection.

33. In combination:

a) an air bag having an undeployed state and a deployed state; and b) an instrument panel which overlies the air bag with the air bag in the undeployed state, the instrument panel comprising:
  i) a skin layer having oppositely facing front and rear surfaces;
  ii) a foamed resin layer on the rear surface of the skin layer, the foamed resin layer having a thickness;
  iii) a core layer having an opening through which the air bag extends with the air bag in the deployed state, the opening bounded by an edge; and
  iv) a door at the opening, the door having a peripheral edge and being repositionable from a closed position into an open position as an incident of the air bag changing from the undeployed state into the deployed state, the skin layer having a break portion defined by a groove at which the skin layer ruptures as the air bag changes from the undeployed state into the deployed state, the groove having first and second spaced sides and a base between the first and second sides and producing a localized reduction in the thickness of the foamed resin layer and having at least a portion that is spaced outwardly from the edge bounding the opening in the core layer, at least a portion of the peripheral edge of the door extending outwardly from the edge bounding the core layer opening toward the groove but not past the groove, wherein the core layer has a joint portion and the door has a joint portion, and the joint portions are in abutting relationship, wherein the joint portions overlap in a direction transverse to a fore and aft line, each of the joint portions has a front surface and a rear surface, and the front surfaces of the joint portions are substantially flush with each other in a fore and aft direction.

* * * * *